United States Patent [19]

Tsataros

[11] Patent Number: 5,699,833
[45] Date of Patent: Dec. 23, 1997

[54] ELECTRO-MECHANICAL FLUID FLOW CONTROL APPARATUS

[76] Inventor: Eddie J. Tsataros, 5822 Imperial Key, Tampa, Fla. 33615

[21] Appl. No.: 621,353

[22] Filed: Mar. 25, 1996

[51] Int. Cl.$^6$ .................................................. F16K 31/02
[52] U.S. Cl. .................. 137/624.11; 251/65; 251/129.04; 4/623
[58] Field of Search ................. 137/624.11; 251/129.04, 251/65; 4/623

[56] References Cited

U.S. PATENT DOCUMENTS

| | | | |
|---|---|---|---|
| 4,651,777 | 3/1987 | Hardman | 251/129.04 X |
| 4,682,628 | 7/1987 | Hill | 137/624.11 |
| 4,948,090 | 8/1990 | Chen | 4/623 X |

Primary Examiner—Kevin Lee
Attorney, Agent, or Firm—A. W. Fisher, III

[57] ABSTRACT

An electro-mechanical fluid flow control apparatus to control the flow of water through a shower head directed to a target zone or a field from an external souce of pressurized water, the electro-mechanical fluid flow control apparatus comprising a valve assembly including a valve member and a valve member positioning device disposed in operatively relationship relative to the valve member to selectively move the valve member between a closed position and an open position and a control assembly to selectively move the valve member from the closed position to the open position allowing water to flow from the external source of pressurized water through the valve assembly to the shower head.

15 Claims, 5 Drawing Sheets

ELECTRO-MECHANICAL FLUID FLOW CONTROL APPARATUS

BACKGROUND OF THE INVENTION

1. Field of the Invention

A fluid flow control apparatus to selectively control the flow of liquid through a shower head.

2. Description of the Prior Art

Due to growing shortages, water conservation has become source of major concern. Numerous efforts have been undertaken to reduce domestic use of water. Such efforts include automatic means to limit the flow of water from showers and faucets to only when water is actually needed or to be used.

U.S. Pat. No. 4,984,314 describes a system for controlling liquid flow in bathrooms in response to the presence of the user. A light emitting device cooperates with a light sensor to detect light reflected from the user. The filtered and amplified output signal from the sensor is demodulated to provide a DC output signal. A first circuit is responsive to the DC output signal to activate fluid flow for a maximum preselected period, to enable use in controlling faucet flow. A second circuit is responsive to the DC signal an includes a device for arming the circuit following the existence of the DC output signal for a first predetermined period and a device for thereupon generating a flow control signal for a second predetermined period following extinction of the DC output signal to enable use of the system to control flushing or urinals or commodes. A third circuit is responsive to the DC output signal provide a flow control signal during the existence of the DC output signal to enable the system to be used for control of the slower flow and includes a device for initial adjustment of water temperature.

U.S. Pat. No. 4,867,189 shows a pair of timers and solenoid operated valve for controlling the time a bather can use a shower. A first timer controls the length of time water flows through the shower by energizing and de-energizing solenoids. Another timer prevents the solenoids from being energized for a predetermined time period after the first timer has turned the water off preventing the shower from being turned on again until the time period has elapsed.

U.S. Pat. No. 5,086,526 teaches a low voltage battery energized passive detection system for generating a control signal in response to radiated heat from a human body part to energize, for settable periods of time, water flow valves and ancillary equipment that may be associated with the act of washing. To minimize power demand, a programmable microchip may be employed as a control unit and have external settable parameters.

U.S. Pat. No. 4,520,516 describes a control circuit mounted on a faucet operating an ultrasonic transducer that transmits ultrasound into a target region below the outlet of the faucet. The circuit is powered by a rechargeable battery that is charged by the action of a generator that is drive by a turbine powered by the flow of water through the faucet.

U.S. Pat. No. 4,651,777 teaches a water supply system control including a microphonic circuit which responds to audio signals and converts those signals into electrical signals which may be timed as chosen in order to control a solenoid-driven water valve assembly.

Additional examples of the prior art are found in the following patents: U.S. Pat. No. 2,926,360; U.S. Pat. No. 3,575,640; U.S. Pat. No. 4,604,764; U.S. Pat. No. 4,688,277; U.S. Pat. No. 5,050,641; U.S. Pat. No. 5,170,944 and U.S. Pat. No. 5,173,178.

SUMMARY OF THE INVENTION

The present invention relates to an electro-mechanical fluid flow control apparatus comprising a valve assembly including a valve member movable between a closed position and an open position and a valve member positioning device disposed in operatively relationship relative to the valve member to selectively move the valve member between the closed position and the open position to control the flow of water through a shower head from an external source of pressurized water.

A control assembly is operatively coupled to the valve member positioning device to selectively generate a control signals to selectively move the valve member from the closed position to the open position allowing water to flow from the external source of pressurized water through the valve assembly to the shower head and a control signal to move the valve member from the open position to the closed position isolating the external source of pressurized water from the shower head.

More specifically, the control assembly includes switching logic to selectively switch operations of the electro-mechanical fluid flow control apparatus between the first and second state and control logic to selectively generate a first control signal upon switching from the first state to the second state to move the valve member from the closed position to the open position for a first predetermined period of time, a first intermediate control signal to close the valve member when the electro-mechanical fluid flow control apparatus is in the second state and a person is not sensed in the target zone or field for a second predetermined period of time and a second intermediate control signal to open the valve member for the second predetermined period of time when the electro-mechanical fluid flow control apparatus is in the second state and a person is sensed in the target zone or field and a fourth control signal to switch operation of the electro-mechanical fluid flow control apparatus from the second state to the first after a third predetermined period of time between the second intermediate control signal and the first intermediate control signal.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

As best shown in FIGS. 1 through 4, the present invention relates to an electro-mechanical fluid flow control apparatus generally indicated as 10 to control the flow of water through a shower head generally indicated as 12 from an external source of pressurized water (not shown) through a water supply conduit 14.

Figure 5:
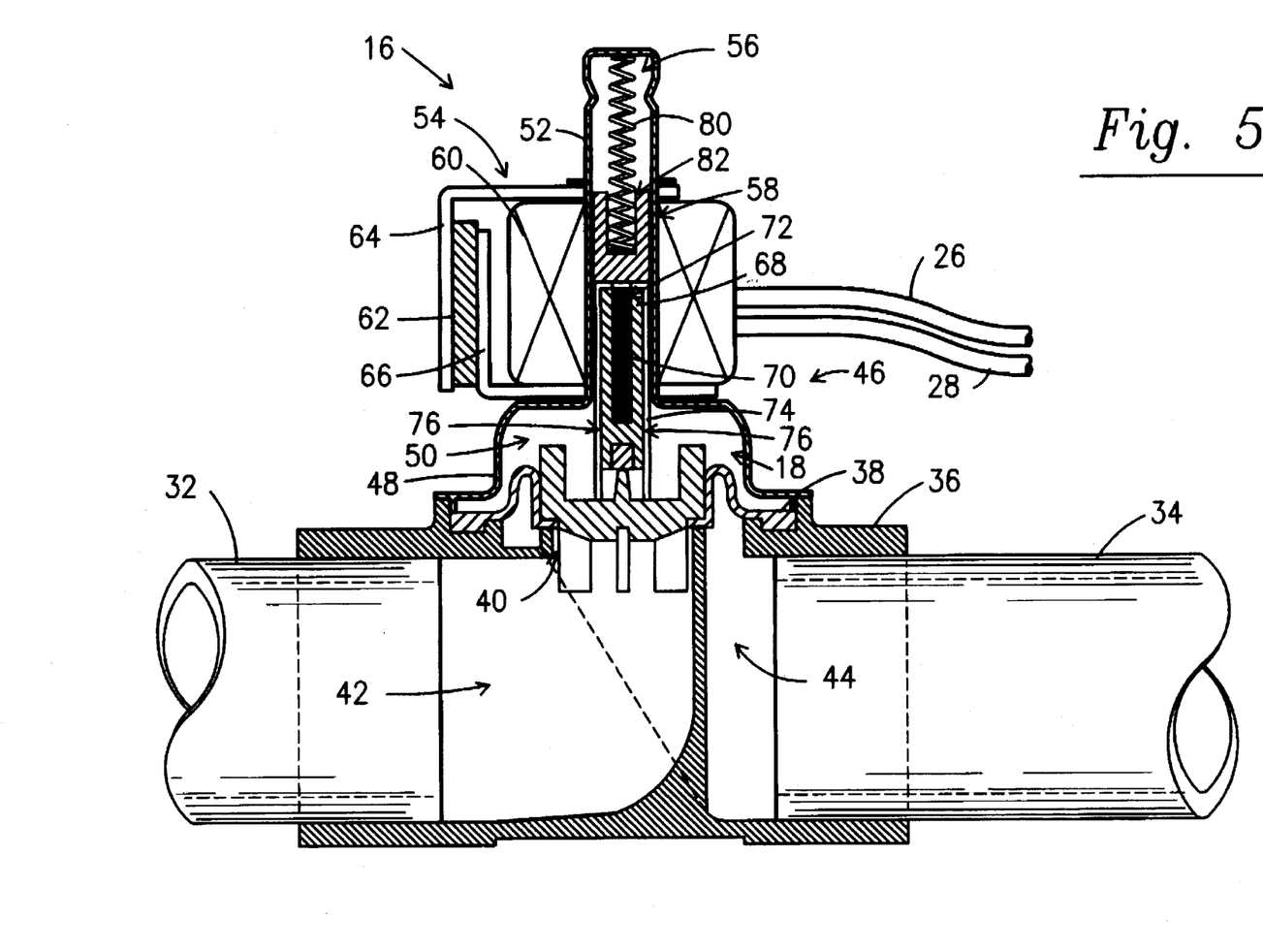
FIG. 5 is a detailed cross-sectional view of the valve assembly of the present invention in the closed position.
Figure 6:
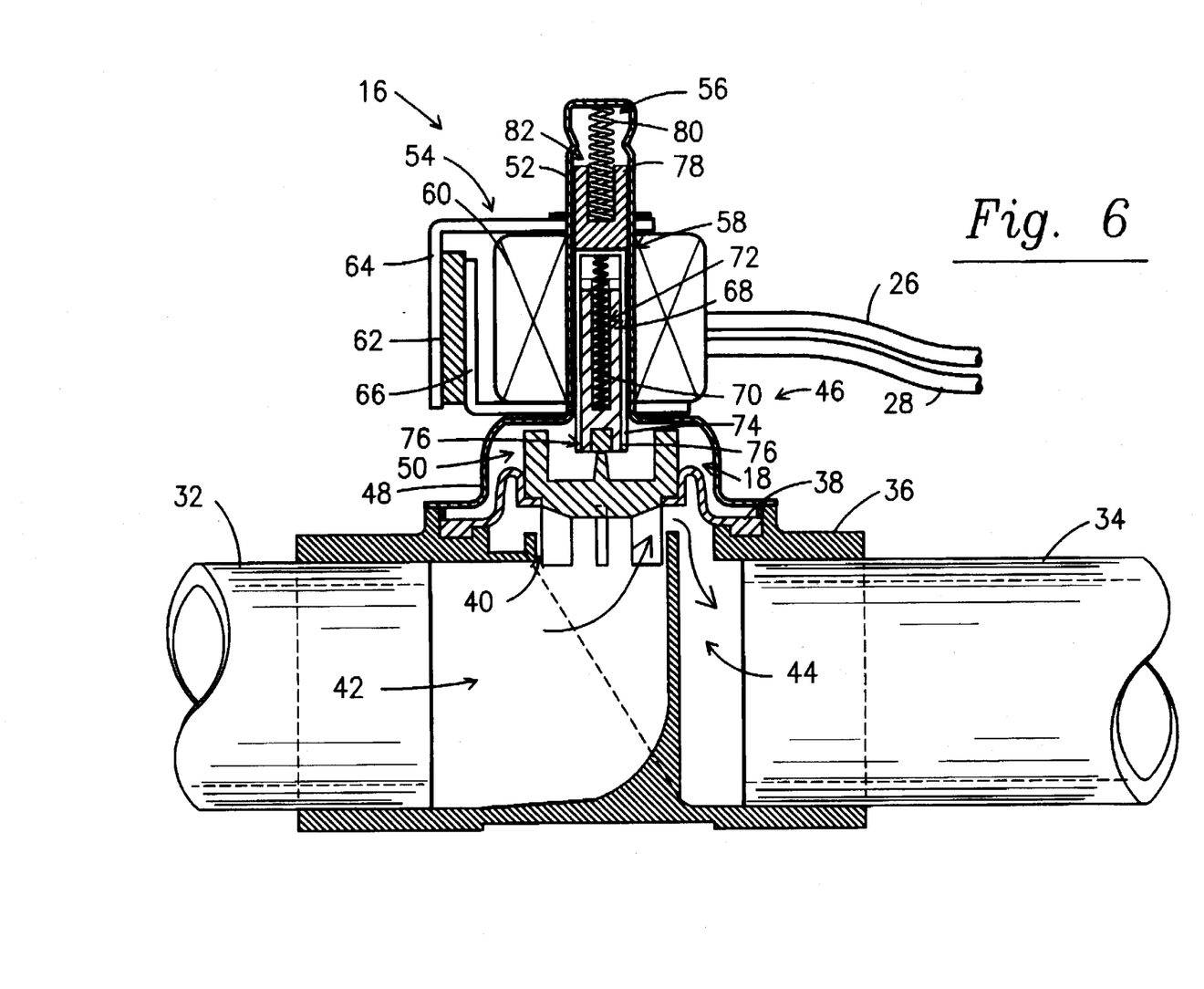
FIG. 6 is a detailed cross-sectional view of the valve assembly of the present invention in the open position.

The electro-mechanical fluid flow control apparatus 10 comprises a valve assembly generally indicated as 16 including a valve member generally indicated as 18 movable between a closed position as shown in FIG. 5 and an open position as shown in FIG. 6 and a valve member positioning device generally indicated as 20 disposed in operatively relationship relative to the valve member 18 to selectively move the valve member 18 between the closed position and the open position and a control assembly generally indicted as 22 including circuitry mounted to a circuit plate or board 24 and operatively coupled to the valve member positioning device 20 by a pair of valve control conductors 26 and 28 to selectively generate control signals to move the valve member 18 from the closed position to the open position allowing water to flow from the external source of pressurized water (not shown) through the valve assembly 16 to the shower head 12 and to move the valve member 18 from the open position to the closed position isolating the external source of pressurized water (not shown) from the shower head 12 as described more fully hereinafter. The various components and subassemblies of the valve assembly 16 and the control assembly 22 are mounted on or disposed within a housing 30 coupled in fluid communications between a fluid inlet supply conduit 32 and a fluid outlet supply conduit 34.

The details of the valve assembly 16 including the valve member 18 and the valve member positioning device 20 are best shown in FIGS. 5 and 6. Specifically, the valve member 18 is movably mounted to a valve body 36 by a resilient valve member retainer 38. The valve body 36 includes a valve flow port 40 disposed to be selectively closed by the valve member 18 and coupled between the fluid inlet supply conduit 32 and the fluid outlet supply conduit 34 by an inlet port 42 and an outlet port 44 respectively. A valve housing generally indicated as 46 comprises a lower enlarged housing portion 48 having a valve chamber 50 formed therein to operatively house the valve member 18 and an upper elongated housing portion 52 having an outer actuator assembly generally indicated as 54 disposed about the exterior thereof including an actuator chamber 56 formed therein to operatively house an inner actuator assembly generally indicated as 58 movable between an extended and retracted position.

The outer actuator assembly 54 comprises an electromagnetic coil 60 disposed in surrounding relationship relative to the inner actuator assembly 58 and connected to the control assembly 22 by the pair of valve control conductors 26 and 28 to receive control signals therefrom and a permanent magnet 62 held in spaced relationship relative to the electromagnetic coil 60 and the inner actuator assembly 58 by a first and second mounting bracket indicated as 64 and 66 respectively.

The inner actuator assembly 58 comprises a lower substantially cylindrical actuator member 68 having a lower bias or spring 70 disposed within a recess 72 formed therein and an inverted substantially U-shaped valve positioning element 74 movably mounted between a lower position and an upper position within a pair of grooves each indicated as 76 formed on opposite sides of the lower substantially cylindrical actuator member 68 and an upper substantially cylindrical actuator member 78 having an upper bias or spring 80 disposed within a recess 82 formed therein such that the lower end of the inverted substantially U-shaped valve positioning element 74 is normally biased in the lower position as shown in FIG. 5 to engage the valve member 18 to retain or hold the valve member 18 in the closed position wherein the electro-magnetic coil 60 selectively moves the inner actuator assembly 58 to the retracted position whereby the lower end of the inverted substantially U-shaped positioning element 76 disengages the valve member 18 as shown in FIG. 6 opening the valve member 18 by the resilient valve member retainer 38.

Figure 1:
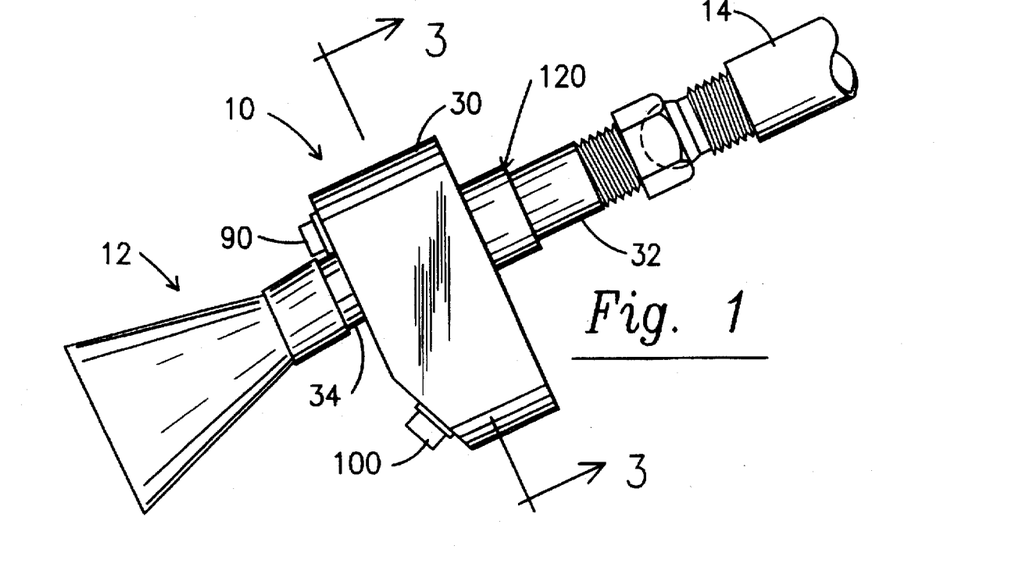
FIG. 1 is a side view of the electro-mechanical fluid flow control apparatus of the present invention mounted to a shower head.
Figure 2:
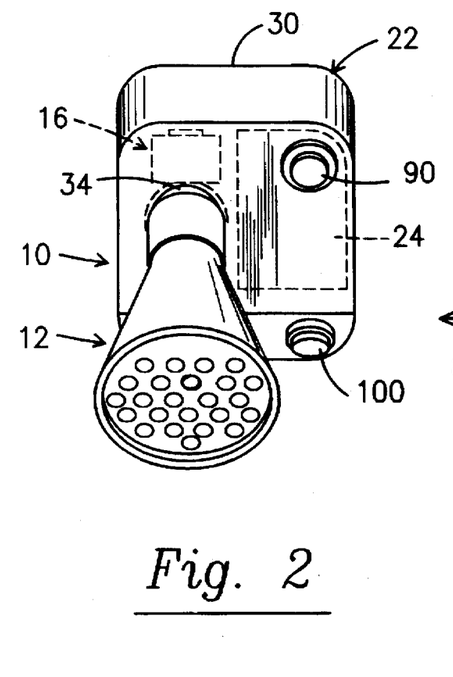
FIG. 2 is a front view of of the electro-mechanical fluid flow control apparatus of the present invention mounted to a shower head.
Figure 3:
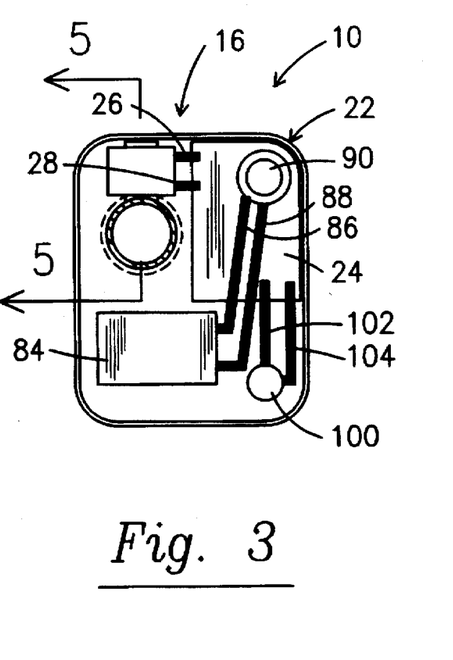
FIG. 3 is a front view of the electro-mechanical fluid flow control apparatus of the present invention mounted to a shower head taken along line 3—3 of FIG. 1.
Figure 4:
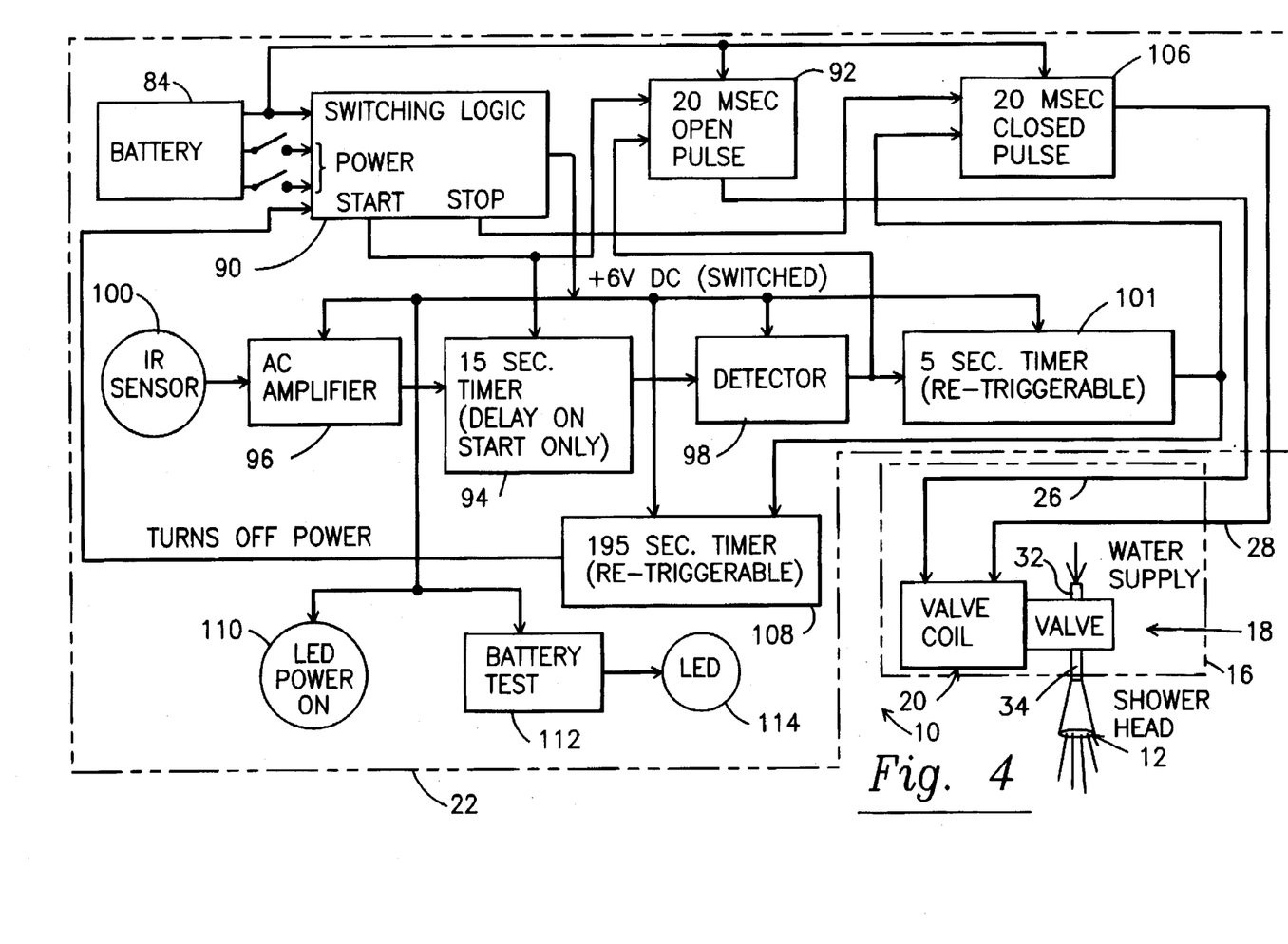
FIG. 4 is a schematic block diagram of the electro-mechanical fluid flow control apparatus of the present invention mounted to a shower head.

Operation of the control assembly 22 comprising an array of logic gates can best be understood with reference to FIGS. 1 and 4. The elector-mechanical fluid flow control apparatus 10 is operable in a first state to prevent flow of water therethrough and a second state to selectively allow water to flow therethrough. The control assembly 22 includes switching logic to generate a power on signal and a power off signal to selectively switch operations of the electro-mechanical fluid flow control apparatus 10 between the first and second state and control logic to selectively generate a first control signal upon switching from the first state to the second state to move the valve member 18 from the closed position to the open position for a first predetermined period of time such as twenty seconds, a first intermediate control signal to close the valve member 18 when the electro-mechanical fluid flow control apparatus 10 is in the second state and a person is not sensed in the target zone or field for a second predetermined period of time such as five seconds and a second intermediate control signal to open the valve member 18 for the second predetermined Period of time of five seconds when the electro-mechanical fluid flow control apparatus 10 is in the second state and a person is sensed in the target zone or field and a fourth control signal to switch operation of the electro-mechanical fluid flow control apparatus 10 from the second state to the first state after a third predetermined period of time such as 195 seconds between the first intermediate control signal and the second intermediate control signal. Of course, the electro-mechanical fluid flow control apparatus 10 can be returned to the first state by use of the switch means 90.

The control assembly 22 comprising an array of logic gates can be best understood with reference to FIGS. 1 and 4. Electricity fed to the control circuitry from a power source such as a battery 84 through a pair of conductors 86 and 88 is controlled by a switch means 90. The switch means 90 may comprise a single ON-OFF switch or two separate switches, ON and OFF, to control the circuit power. When the switch means 90 is actuated or turned ON, power is applied to the circuits and a twenty millisecond open or first pulse circuit 92 generates the energizing signal to open the valve member 18 for the first predetermined period of time. A fifteen second first timer 94 prevents a detector circuit from operating upon initial turn-on so that the valve member 18 remains open. After fifteen seconds, a sensor amplifier 96 and a detector 98 become operational to receive sensing signals from the infra-red sensor 100. Any signal from the detector 98 is delayed an additional five seconds after initial energizing of the control circuitry by a five second re-triggerable valve cycling timer 101 holding the valve member 18 open for at least twenty seconds.

The infra-red sensor 100 connected to the control assembly 22 by a pair of conductors 102 and 104 responds to wavelengths longer than those of the visible light spectrum in the infra-red region. Since the radiant energy is associated with heat, the infra-red sensor 100 will sense the presence of a person within the target zone or field in a bathtub, a shower enclosure or the like.

The AC amplifier 96 only responds to change in the sensor's field, rather than stable ambient conditions. In other words, the sensor circuit adapts to whatever conditions of light and warmth are present, and then only responds to movement in the target zone or field because the AC amplifier 96 is alternating current coupled.

If a person is not sensed within the target zone or field at the end of the first predetermined period of time of twenty seconds during which the valve member 18 is open, the detector 98 sends a signal to a twenty millisecond second or close pulse circuit 106 to generate the second intermediate control signal. Since the five second valve cycling timer 101 is re-triggerable, if there is motion in the sensor field, the twenty millisecond second or close pulse circuit 106 is not triggered, causing the valve member 18 to remain open. As soon as motion stops, the five second valve cycling timer 101 is triggered. At the end of five seconds if no motion is detected in the target field or zone, the twenty millisecond second or close pulse 106 closes the valve member 18.

The fifteen second first timer 94 is disabled after the first operation. Thus, subsequent motion in the target field or zone triggers the first or open pulse circuit 92 immediately. When the motion stops, the valve member 18 remains open for five seconds, and then is closed. This sequence is repeated as many times as motion in the target field or zone starts and stops.

Each time the five second valve cycling timer 101 triggers the second or close pulse circuit 106, a third timer 108 is triggered a deenergizing signal to switch operation of the electro-mechanical fluid flow control apparatus 10 from the second or energized state to the first or deenergized after a third predetermined period of time such as 195 seconds between the second intermediate control signal and the first intermediate control signal.

An LED lamp 114 is provided to indicate when the battery 84 is beginning to weaken. The LED 116 is illuminated during normal operation. Each time the valve member 18 is moved, the current load causes a transient in the supply voltage. When this transient reaches a critical level, the LED 114 is turned off and the LED 114 becomes dark during normal operation. There is still sufficient battery life for continued use for a limited time. However, the battery 84 should be replaced.

Figure 7:
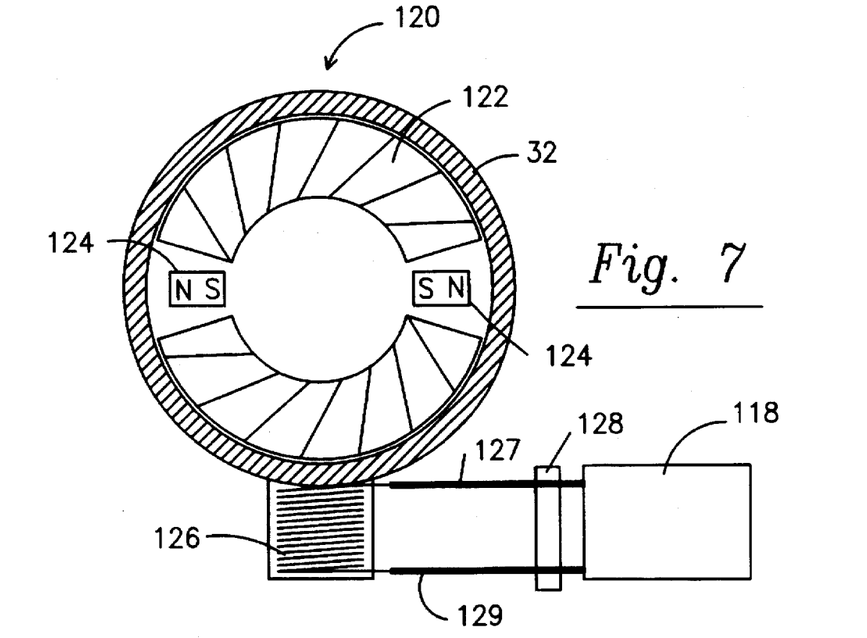
FIG. 7 is an end view of the generator means of the present invention.
Figure 8:
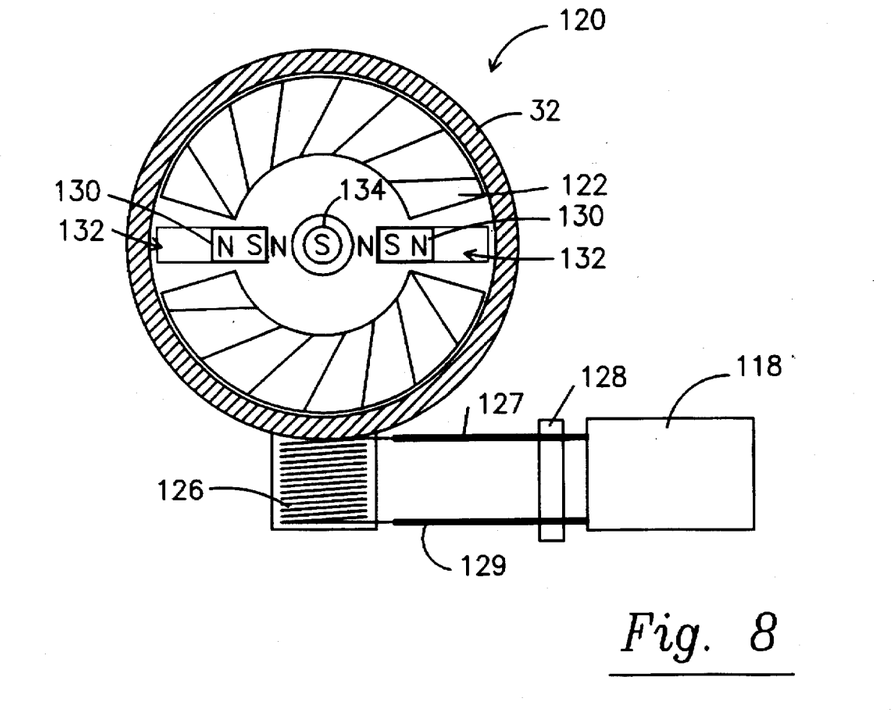
FIG. 8 is an end view of an alternate embodiment of the generator means of the present invention.

Power to operate electronics may be provided by a rechargeable battery 118 as shown in FIGS. 7 and 8. The rechargeable battery 118 is recharged by a generator generally indicated as 120 powered by the water flow through the shower head 12. As shown in FIG. 7, water flooring through a turbine or rotor 122 rotates a pair of magnets each indicated as 124 past an inductive pickup coil 126. The rectifier/regulator circuit 128 then converts the pulses to charge the rechargeable battery 118 through conductor 127 and 129.

FIG. 8 shows a pair of retractable magnets each indicated as 130 normally retained or held in a retracted position at least partially disposed within a corresponding channel 132 by a centrally disposed magnet 134. This allows the turbine or rotor 122 to start turning without magnetic resistance. As the turbine or rotor 122 rotates, centrifugal force will force the retractable magnets 128 to move outwardly in the corresponding channel 132 to induce pulses in the coil 126 to recharge the rechargeable battery 118.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. An electro-mechanical fluid flow control apparatus to control the flow of water through a shower head directed to a target zone or a field from an external souce of pressurized water wherein said electro-mechanical fluid flow control apparatus comprises a valve assembly including a valve member and a valve member positioning device disposed in operatively relationship relative to the valve member to selectively move the valve member between a closed position and an open position and a control assembly to selectively move the valve member from the closed position to the open position allowing water to flow from the external source of pressurized water through the valve assembly to the shower head, said valve member is movably mounted to a valve body by a resilient valve member retainer, said valve body includes a valve flow port disposed to be selectively closed by said valve member and coupled between a fluid inlet supply conduit and a fluid outlet supply conduit by an inlet port and an outlet port respectively, a valve housing comprises a lower enlarged housing portion having a valve chamber formed therein to operatively house said valve member and an upper elongated housing portion having an outer actuator assembly disposed about the exterior thereof including an actuator chamber formed therein to operatively house an inner actuator assembly movable between an extended and retracted position, said outer actuator assembly comprises an electro-magnetic coil disposed in surrounding relationship relative to said inner actuator assembly and electrically connected to said control assembly to receive control signals therefrom and a permanent magnet disposed in spaced relationship relative to said electro-magnetic coil and said inner actuator assembly, said inner actuator assembly comprises a lower actuator member having a lower bias disposed within a recess formed therein and a shaped valve positioning element movably mounted between a lower position and an upper position within a pair of grooves formed on opposite sides of said actuator member and an actuator member having an upper bias disposed within a recess formed therein such that said lower end of said valve positioning element is normally biased in said lower position to engage said valve member to retain said valve member in said closed position, and said electro-magnetic coil selectively moves said inner actuator assembly to the retracted position whereby the lower end of said positioning element disengages said valve member opening said valve member.

2. The electro-mechanical fluid flow control apparatus of claim 1 wherein said elector-mechanical fluid flow control apparatus is operable in a first state to prevent flow of water therethrough and a second state to selectively allow water to flow therethrough, said control assembly includes switching logic to generate a power on signal and a power off signal to selectively switch operations of said electro-mechanical fluid flow control apparatus between said first state and said second state and control logic to selectively generate a first control signal upon switching from said first state to said second state to move said valve member from the closed position to the open position for a first predetermined period of time, a first intermediate control signal to close said valve member when said electro-mechanical fluid flow control apparatus is in said second state and a person is not sensed in the target zone or field for a second predetermined period of time and a second intermediate control signal to open said valve member for the second predetermined period of time of five seconds when said electro-mechanical fluid flow control apparatus is in said second state and a person is sensed in the target zone or field and a fourth control signal to switch operation of said electro-mechanical fluid flow control apparatus from said second state to said first state after a third predetermined period of time between said first intermediate control signal and said second intermediate control signal.

3. The electro-mechanical fluid flow control apparatus of claim 2 further including a rechargeable battery rechargeable by a generator powered by the water flow through the shower head, water flowing through a rotor rotates a pair of retractable magnets past an inductive pickup coil, said pair of retractable magnets are normally retained in a retracted position at least partially disposed within a corresponding channel by a centrally disposed magnet such that said rotor starts turning without magnetic resistance and that as rotor rotates, centrifugal force will force said retractable magnets to move outwardly in said corresponding channel to induce pulses in said inductive pickup coil to recharge said rechargeable battery.

4. The electro-mechanical fluid flow control apparatus of claim 1 wherein further including a rechargeable battery rechargeable by a generator powered by the water flow through the shower head, water flowing through a rotor rotates a pair of retractable magnets past an inductive pickup coil, said pair of retractable magnets are normally retained in a retracted position at least partially disposed within a corresponding channel by a centrally disposed magnet such that said rotor starts turning without magnetic resistance and that as rotor rotates, centrifugal force will force said retractable magnets to move outwardly in said corresponding channel to induce pulses in said inductive pickup coil to recharge said rechargeable battery.

5. The electro-mechanical fluid flow control apparatus of claim 4 wherein said elector-mechanical fluid flow control apparatus is operable in a first state to prevent flow of water therethrough and a second state to selectively allow water to flow therethrough, said control assembly includes switching logic to generate a power on signal and a power off signal to selectively switch operations of said electro-mechanical fluid flow control apparatus between said first state And said second state and control logic to selectively generate a first control signal upon switching from said first state to said second state to move said valve member from the closed position to the open position for a first predetermined period of time, a first intermediate control signal to close said valve member when said electro-mechanical fluid flow control apparatus is in said second state and a person is not sensed in the target zone or field for a second predetermined period of time and a second intermediate control signal to open said valve member for the second predetermined period of time of five seconds when said electro-mechanical fluid flow control apparatus is in said second state and a person is sensed in the target zone or field and a fourth control signal to switch operation of said electro-mechanical fluid flow control apparatus from said second state to said first state after a third predetermined period of time between said first intermediate control signal and said second intermediate control signal.

6. An electro-mechanical fluid flow control apparatus to control the flow of water through a shower head directed to a target zone or a field from an external souce of pressurized water wherein said electro-mechanical fluid flow control apparatus comprises a valve assembly including a valve member and a valve member positioning device disposed in operatively relationship relative to the valve member to selectively move the valve member between a closed position and an open position and a control assembly to selectively move the valve member from the closed position to the open position allowing water to flow from the external source of pressurized water through the valve assembly to the shower head, said valve member is movably mounted to a valve body by a resilient valve member retainer, said valve body includes a valve flow port disposed to be selectively closed by said valve member and coupled between a fluid inlet supply conduit and a fluid outlet supply conduit by an inlet port and an outlet port respectively, a valve housing comprises a lower enlarged housing portion having a valve chamber formed therein to operatively house said valve member and an upper elongated housing portion having an outer actuator assembly disposed about the exterior thereof including an actuator chamber formed therein to operatively house an inner actuator assembly movable between an extended and retracted position, said outer actuator assembly comprises an electro-magnetic coil disposed in surrounding relationship relative to said inner actuator assembly and electrically connected to said control assembly to receive control signals therefrom and a permanent magnet disposed in spaced relationship relative to said electromagnetic coil and said inner actuator assembly, said inner actuator assembly comprises a lower actuator member having a lower bias disposed within a recess formed therein and a shaped valve positioning element movably mounted between a lower position and an upper position within a pair of grooves formed on opposite sides of said actuator member and an actuator member having an upper bias disposed within a recess formed therein such that said lower end of said valve positioning element is normally biased in said lower position to engage said valve member to retain said valve member in said closed position, and said electromagnetic coil selectively moves said inner actuator assembly to the retracted position whereby the lower end of said positioning element disengages said valve member opening said valve member, said control assembly includes switching logic to selectively switch operation of the electro-mechanical fluid flow control apparatus between a first state and a second state and circuitry operatively coupled to said valve member positioning device to selectively generate a first signal to move said valve member from the closed position to the open position allowing water to flow from the external source of pressurized water through said valve assembly to the shower head and a second signal to move said valve member from the open position to the closed position isolating the external source of pressurized water from said shower head when said electro-mechanical fluid flow control apparatus is in the second state and to prevent flow of water through said electro-mechanical fluid flow control apparatus when in the first state.

7. The electro-mechanical fluid flow control apparatus of claim 6 wherein said elector-mechanical fluid flow control apparatus is operable in a first state to prevent flow of water therethrough and a second state to selectively allow water to flow therethrough, said control assembly includes switching logic to generate a power on signal and a power off signal to selectively switch operations of said electro-mechanical fluid flow control apparatus between said first state and said second state and control logic to selectively generate a first control signal upon switching from said first state to said second state to move said valve member from the closed position to the open position for a first predetermined period of time, a first intermediate control signal to close said valve member when said electro-mechanical fluid flow control apparatus is in said second state and a person is not sensed in the target zone or field for a second predetermined period of time and a second intermediate control signal to open said valve member for the second predetermined period of time of five seconds when said electro-mechanical fluid flow control apparatus is in said second state and a person is sensed in the target zone or field and a fourth control signal to switch operation of said electro-mechanical fluid flow control apparatus from said second state to said first state after a third predetermined period of time between said first intermediate control signal and said second intermediate control signal.

8. The electro-mechanical fluid flow control apparatus of claim 7 further including a rechargeable battery rechargeable by a generator powered by the water flow through the shower head, water flowing through a rotor rotates a pair of retractable magnets past an inductive pickup coil, said pair of retractable magnets are normally retained in a retracted position at least partially disposed within a corresponding channel by a centrally disposed magnet such that said rotor starts turning without magnetic resistance and that as rotor rotates, centrifugal force will force said retractable magnets to move outwardly in said corresponding channel to induce pulses in said inductive pickup coil to recharge said rechargeable battery.

9. The electro-mechanical fluid flow control apparatus of claim 6 wherein further including a rechargeable battery rechargeable by a generator powered by the water flow through the shower head, water flowing through a rotor rotates a pair of retractable magnets past an inductive pickup coil, said pair of retractable magnets are normally retained in a retracted position at least partially disposed within a corresponding channel by a centrally disposed magnet such that said rotor starts turning without magnetic resistance and that as rotor rotates, centrifugal force will force said retractable magnets to move outwardly in said corresponding channel to induce pulses in said inductive pickup coil to recharge said rechargeable battery.

10. The electro-mechanical fluid flow control apparatus of claim 9 wherein said elector-mechanical fluid flow control apparatus is operable in a first state to prevent flow of water therethrough and a second state to selectively allow water to flow therethrough, said control assembly includes switching logic to generate a power on signal and a power off signsl to selectively switch operations of said electro-mechanical fluid flow control apparatus between said first state and said second state and control logic to selectively generate a first control signal upon switching from said first state to said second state to move said valve member from the closed position to the open position for a first predetermined period of time, a first intermediate control signal to close said valve member when said electro-mechanical fluid flow control apparatus is in said second state and a person is not sensed in the target zone or field for a second predetermined period of time and a second intermediate control signal to open said valve member for the second predetermined period of time of five seconds when said electro-mechanical fluid flow control apparatus is in said second state and a person is sensed in the target zone or field and a fourth control signal to switch operation of said electro-mechanical fluid flow control apparatus from said second state to said first state after a third predetermined period of time between said first intermediate control signal and said second intermediate control signal.

11. An electro-mechanical fluid flow control apparatus to control the flow of water through a shower head directed to a target zone or a field from an external souce of pressurized water wherein said electro-mechanical fluid flow control apparatus comprises a valve assembly including a valve member and a valve member positioning device disposed in operatively relationship relative to the valve member to selectively move the valve member between a closed position and an open position and a control assembly to selectively move the valve member from the closed position to the open position allowing water to flow from the external source of pressurized water through the valve assembly to the shower head, said control assembly includes switching logic to selectively switch operation of the electro-mechanical fluid flow control apparatus between a first state and a second state and circuitry operatively coupled to said valve member positioning device to selectively generate a first signal to move said valve member from the closed position to the open position allowing water to flow from the external source of pressurized water through said valve assembly to the shower head and a second signal to move said valve member from the open position to the closed position isolating the external source of pressurized water from said shower head when said electro-mechanical fluid flow control apparatus is in the second state and to prevent flow of water through said electro-mechanical fluid flow control apparatus when in the first state and a rechargeable battery rechargeable by a generator powered by the water flow through the shower head, water flowing through a rotor rotates a pair of retractable magnets past an inductive pickup coil, said pair of retractable magnets are normally retained in a retracted position at least partially disposed within a corresponding channel by a centrally disposed magnet such that said rotor starts turning without magnetic resistance and that as rotor rotates, centrifugal force will force said retractable magnets to move outwardly in said corresponding channel to induce pulses in said inductive pickup coil to recharge said rechargeable battery.

12. The electro-mechanical fluid flow control apparatus of claim 11 wherein said elector-mechanical fluid flow control apparatus is operable in a first state to prevent flow of water therethrough and a second state to selectively allow water to flow therethrough, said control assembly includes switching logic to generate a power on signal and a power off signal to selectively switch operations of said electro-mechanical fluid flow control apparatus between said first state and said second state and control logic to selectively generate a first control signal upon switching from said first state to said second state to move said valve member from the closed position to the open position for a first predetermined period of time, a first intermediate control signal to close said valve member when said electro-mechanical fluid flow control apparatus is in said second state and a person is not sensed in the target zone or field for a second predetermined period of time and a second intermediate control signal to open said valve member for the second predetermined period of time of five seconds when said electro-mechanical fluid flow control apparatus is in said second state and a person is sensed in the target zone or field and a fourth control signal to switch operation of said electro-mechanical fluid flow control apparatus from said second state to said first state after a third predetermined period of time between said first intermediate control signal and said second intermediate control signal.

13. The electro-mechanical fluid flow control apparatus of claim 12 further including a rechargeable battery rechargeable by a generator powered by the water flow through the shower head, water flowing through a rotor rotates a pair of retractable magnets past an inductive pickup coil, said pair of retractable magnets are normally retained in a retracted position at least partially disposed within a corresponding channel by a centrally disposed magnet such that said rotor starts turning without magnetic resistance and that as rotor rotates, centrifugal force will force said retractable magnets to move outwardly in said corresponding channel to induce pulses in said inductive pickup coil to recharge said rechargeable battery.

14. The electro-mechanical fluid flow control apparatus of claim 11 wherein further including a rechargeable battery rechargeable by a generator powered by the water flow through the shower head, water flowing through a rotor rotates a pair of retractable magnets past an inductive pickup coil, said pair of retractable magnets are normally retained in a retracted position at least partially disposed within a corresponding channel by a centrally disposed magnet such that said rotor starts turning without magnetic resistance and that as rotor rotates, centrifugal force will force said retractable magnets to move outwardly in said corresponding channel to induce pulses in said inductive pickup coil to recharge said rechargeable battery.

15. The electro-mechanical fluid flow control apparatus of claim 14 wherein said elector-mechanical fluid flow control apparatus is operable in a first state to prevent flow of water therethrough and a second state to selectively allow water to flow therethrough, said control assembly includes switching logic to generate a power on signal and a power off signal to selectively switch operations of said electro-mechanical fluid flow control apparatus between said first state and said second state and control logic to selectively generate a first control signal upon switching from said first state to said second state to move said valve member from the closed position to the open position for a first predetermined period of time, a first intermediate control signal to close said valve member when said electro-mechanical fluid flow control apparatus is in said second state and a person is not sensed in the target zone or field for a second predetermined period of time and a second intermediate control signal to open said valve member for the second predetermined period of time of five seconds when said electromechanical fluid flow control apparatus is in said second state and a person is sensed in the target zone or field and a fourth control signal to switch operation of said electro-mechanical fluid flow control apparatus from said second state to said first state after a third predetermined period of time between said first intermediate control signal and said second intermediate control signal.

\* \* \* \* \*